US005519294A

United States Patent [19]
Chen et al.

[11] Patent Number: 5,519,294
[45] Date of Patent: May 21, 1996

[54] TORQUE CONTROL METHOD AND DEVICE FOR BRUSHLESS DC MOTORS FOR USE IN ELECTRIC MOTORCYCLES

[75] Inventors: Tshaw-Chuang Chen; Huann-Jen Yung; Hong-Shi Chang; Yaw-Shih Shieh, all of Chutung Town, Taiwan

[73] Assignee: Industrial Technology Research Institute, Chutung, Taiwan

[21] Appl. No.: 101,461

[22] Filed: Aug. 2, 1993

[51] Int. Cl.$^6$ ........................................................ H02P 7/00
[52] U.S. Cl. .......................... 318/432; 318/434; 318/433; 318/362
[58] Field of Search ..................................... 318/432, 434, 318/433, 362

[56] References Cited

U.S. PATENT DOCUMENTS 4,322,669  3/1982  Fukuma et al. ........................ 318/432
4,833,388  5/1989  Dorner .................................... 318/432
5,289,890  3/1994  Toyoda et al. .......................... 318/432

Primary Examiner—William M. Shoop, Jr.
Assistant Examiner—Karen Masih
Attorney, Agent, or Firm—W. Wayne Liauh

[57] ABSTRACT

A method and device for controlling the torque of a brushless DC motor used in an electric motorcycle, in which a single current loop is employed to obtain a feedback current by a current detector from a DC bus which simplifies the construction of the circuit scheme. The device of this invention operates by two input signals; one of them is a torque command signal to generate a positive torque of the motor, and the other is brake command signal to generate a negative torque of the motor so as to operate a control brake command and to store the energy generated during a braking operation into a battery of the motorcycle, as well as to stop the rotation of the brushless DC motor within 120° of its electrical angle of reversed rotation.

4 Claims, 4 Drawing Sheets

5,519,294

1

TORQUE CONTROL METHOD AND DEVICE FOR BRUSHLESS DC MOTORS FOR USE IN ELECTRIC MOTORCYCLES

BACKGROUND OF THE INVENTION

The present invention relates to a method and a device for controlling the torque of a brushless DC motor used in an electric motorcycle. More particularly, a device in which a single current loop is applied to detect a feed-back current from a DC bus of the driver, and a torque command signal is input to generate the motor's positive torque, or a brake command signal is input to generate the motor's negative torque. The devices cause the brushless DC motor to stop when the electrical angle of reverse rotation of the motor becomes less than 120°.

Generally, a driver circuit of the motor used in an electrical motorcycle is so designed to provide simplicity, reliability and compactness; plus, an ability of restoring the energy generated during a braking operation into a battery of the motor is preferred.

Conventionally, a general-purpose brushless DC motor is so operated as torque control that 2 or 3 phase currents are used to perform a feedback control with 2 or 3 detectors in association with 2 or 3 low pass filters. The input signal supplied to torque controlling circuit is only an analog torque command which can be a positive or negative voltage signal and is supplied to a current compensator with a simultaneous current feedback signal therefore an analog torque command can generate positive or negative torque to rotate the motor in a clockwise or a counterclockwise direction.

In the case of a gas-powered motorcycle, the motor is adapted to generate a positive torque only to perform a forward rotation as gas is applied. Likewise, the electric motor to be controlled by the device of the invention is to rotate in a forward direction and the rotation in a reversed direction is prohibited.

The present invention has been accomplished under the aforesaid circumstances. The device of this present invention employs a single current loop to obtain a feedback control current signal from the DC bus by a detector, such that one shunt can be used in common for both a current feedback circuit and a current limiting circuit, as disclosed in a U.S. patent application Ser. No. 08/012,889, now U.S. Pat. No. 5,341,077 for METHOD AND DEVICE FOR LIMITING ELECTRIC CURRENT SUPPLIED TO THE MOTOR OF AN ELECTRIC VEHICLE. There are two signals input to the control torque circuit; one of them is a torque signal for generating a positive torque, and the other is a braking signal for generating a negative torque. When the motor is operated to generate a negative torque, it operates as a generator to produce an electrical power during a braking operation, and the produced electrical power is stored in the battery; it will stop when its angle of rotation becomes less than 120° electrical angle (40° mechanical angle for a 6-pole motor) in a reversed direction rotation, so that the electric motorcycle will not rotate backwardly.

SUMMARY OF THE INVENTION

It is an object of the present invention to provide a simplified method and device for controlling the torque of a brushless DC motor used in an electric motorcycle with only one, single current feedback circuit.

2

It is another object of the present invention to provide a simplified method and device for controlling the torque of a brushless DC motor for use in an electric motorcycle, in which a braking command is input to generate a negative torque and to store the energy generated during a braking operation in a battery of the motorcycle.

It is still another object of present invention to provide a simplified method and device for controlling the torque of an electrical motorcycle, in which the device will stop the motor's reverse rotation as at within 120° electrical angle accused as soon as a negative torque is produced.

The present invention proposes a method for controlling the torque of a brushless DC motor used in the electric motorcycle, which method comprises the steps of:

(1) detecting the current flowing through a DC bus with a shunt so as to generate a feedback current signal to be supplied to a single current feedback control;

(2) matching the feedback current signal with a torque command input signal which is processed in response to an acceleration of the motorcycle to generate a positive torque, and with a braking command input signal which is processed in response to a braking of the motorcycle to generate a negative torque. The above three signals being supplied to a current compensator to generate a control signal;

(3) controlling the voltage provided to the brushless DC motor, according to the control signal generated by the compensator; and (4) storing the energy generated during the braking operation to the battery of the motorcycle when a negative torque is generated by a braking command, and stopping the motor's as the reversed rotation within 120° degrees of electrical angle has been detected.

The device for controlling the torque of the brushless DC motor used in the electric motorcycle of the present invention comprises:

a signal processor for processing a torque command input signal produced in an accelerating operation, a braking command input signal produced in a braking operation, and a commutation signal produced by a magnetic pole sensor; and producing a proceeded signal to a current compensator; a low pass filter for amplifying and filtering the signal voltage from a shunt, and outputting a signal to the current compensator and a current limiting circuit.

The current compensator being a proportional amplifier, for amplifying and compensating the torque command input signal, the braking command input signal and the current feedback signal in proportion, and outputting a signal to a phase splitter after being processed, so as to generate a control voltage to be supplied to the brushless DC motor.

BRIEF DESCRIPTION OF THE DRAWINGS

As shown is FIG. 1, the device of this invention includes signal processor circuit 1, current compensator circuit 2 and low pass filter circuit 3, therein low pass filter circuit 3 is the same as the one disclosed in copending U.S. application Ser. No. 08/012,889, (in application Ser. No. 08/012,889 the low pass filter circuit 3 is included in the current limiting circuit 12). The operation of the control block diagram of the brushless DC motor used in the electric motorcycle shown in FIG. 1 is such that input torque command 13, input braking command 14 and commutation signal 15 of the brushless DC motor 11 sensed by a magnetic pole sensor 4, after being processed by signal processor circuit 1, are supplied to a current compensator circuit 2. Processed positive torque command 16 and negative torque command 17, and signal 18, which is generated by the voltage in the shunt 6 and supplied the low pass filter 3 for filtering the high frequency noise, are applied to current compensator circuit 2; and output signal 19 is sent to the phase splitter 5 for controlling the voltage provided to the brushless DC motor 11. The output voltage signal 19 is used to control the magnitude of torque of the brushless DC motor 11 in forward/backward rotation, or to cease rotation. At the same time, signal 18, which is generated by the voltage obtained at the shunt 6, is amplified and filtered by the low pass filter 3 and is provided to current limiting circuit 12 as a critical voltage. Voltage signal 18 is processed by the current limiting circuit 12 with its gain switching amplifier and hysteresis level detector to decide whether or not to produce an inhibit command to the pulse width modulation (PWM) circuit 7 for obtaining a multi-stage hysteresis limiting current control of the brushless DC motor 11 (refer to copending application Ser. No. 08/012,889). In FIG. 1, 8 is a gate driver, 9 is a battery, and 10 is an inverter.

Figure 1:
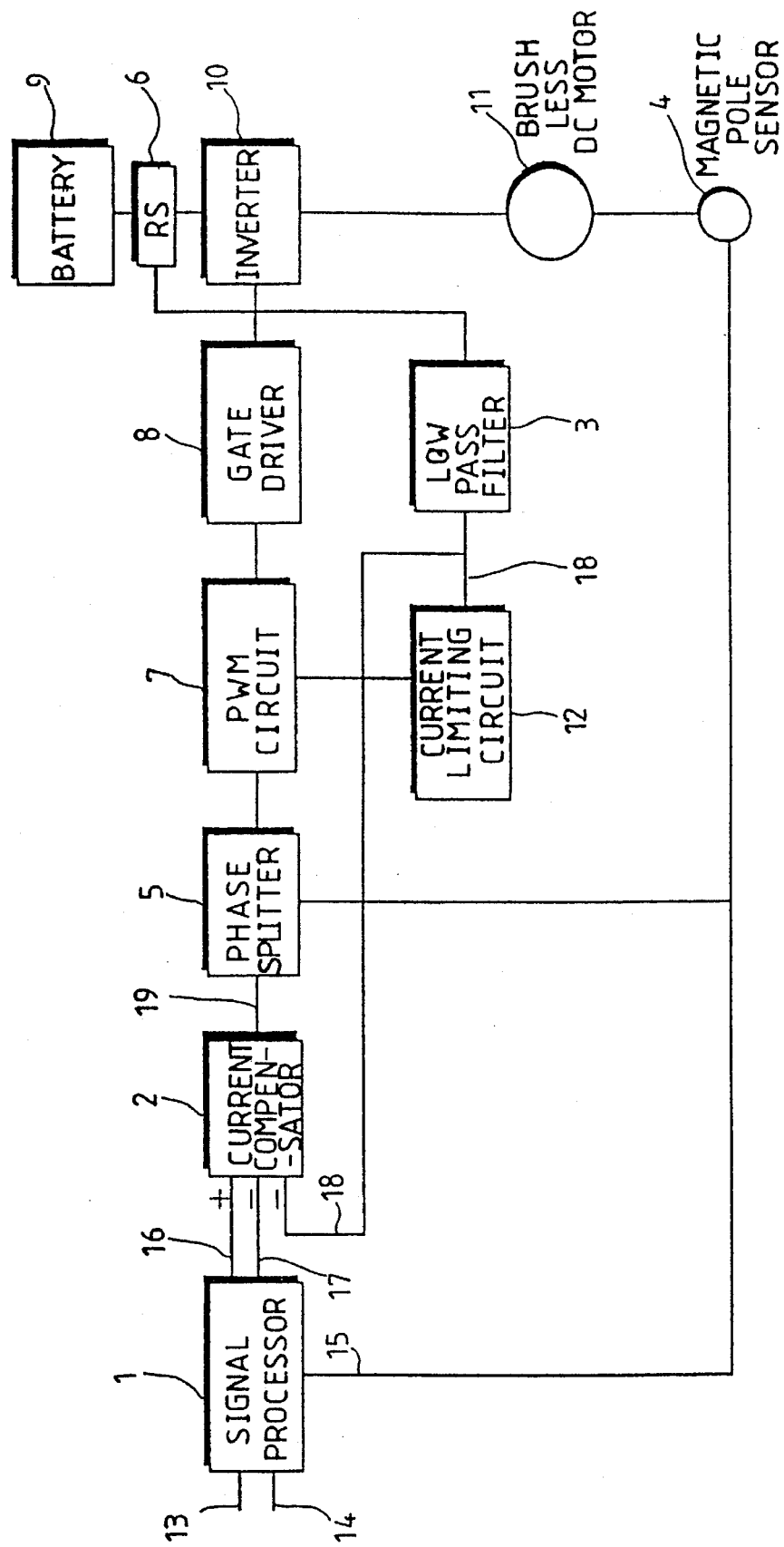
FIG. 1 is a block diagram of the device for controlling the torque of the brushless DC motor used in the electric motorcycle of the present invention.
Figure 2:
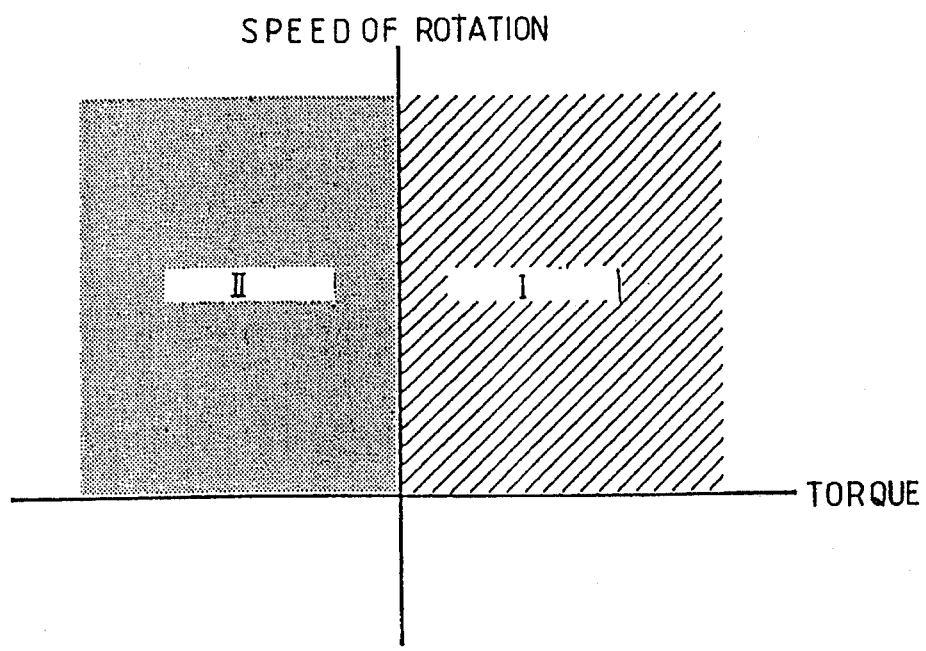
FIG. 2 is a diagram showing the relation between the torque and the rotational speed of the brushless DC motor.

Owing to the two different input control signals of the brushless DC motor used in the electric motorcycle, the brushless DC motor can be operated in two kinds of mode as shown in FIG. 2, one of them is that the motor's rotation is in positive direction and its torque is also positive, and the motor is operated as an electric motor (in quarter I of FIG. 2), and the other is that the motor's rotation is the positive direction and its torque is in a negative direction; the motor is operated as a generator (in quarter II of FIG. 2). In the latter, the motor can store the energy generated by the negative torque to the battery.

Figure 3A:
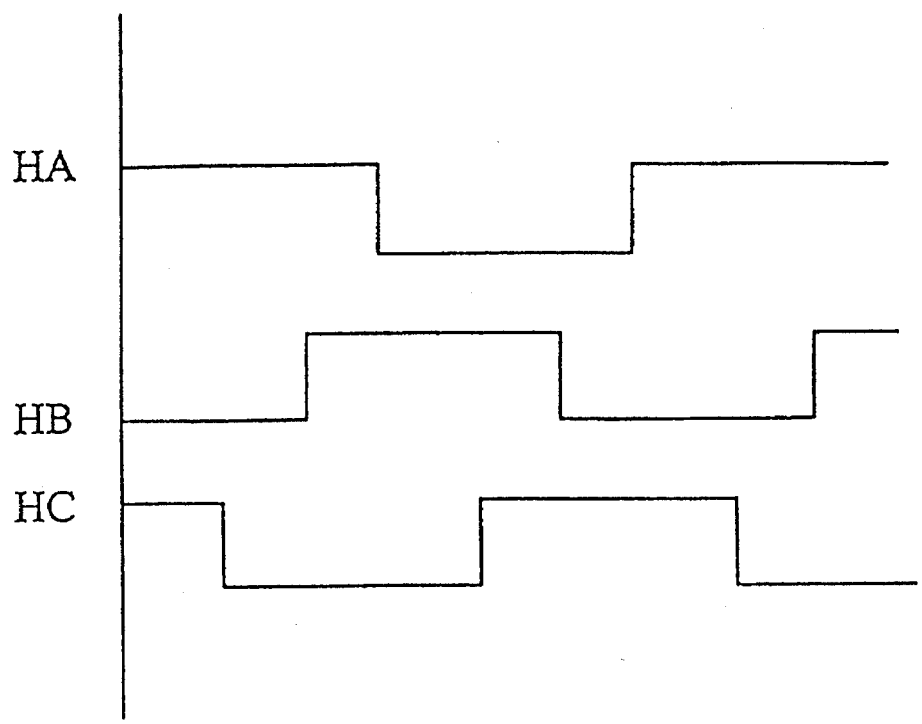
FIG. 3a is a commutation signal diagram of the brushless DC motor as in forward rotation.
Figure 3B:
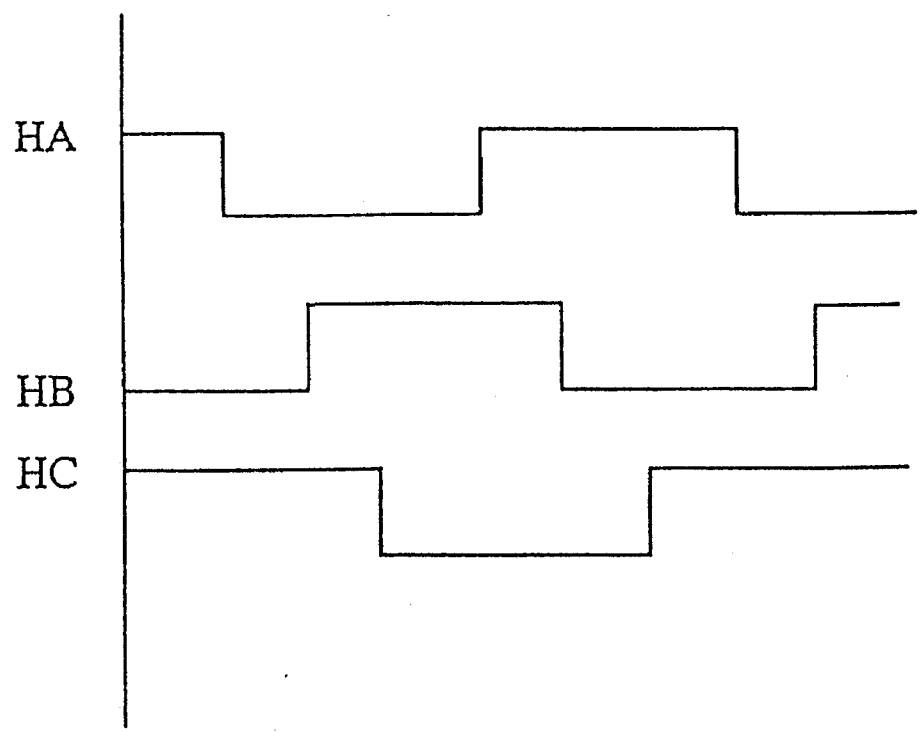
FIG. 3b is a commutation signal diagram of the brushless DC motor as in backward rotation.

The three input signals—torque command signal 13, braking command signal 14 and commutation signal 15 of the magnetic pole sensor 4 are supplied to the signal processor circuit 1. Torque command signal 13 passes through a buffer and then is supplied to the current compensator circuit 2, but it will be grounded by an analog switch as braking command signal 14 is input to the signal processor circuit 1 to actuate a braking detector circuit. The braking command signal 14 passes through a buffer then is also supplied to the current compensator circuit 2. Because the electric motorcycle can only be allowed to drive forward, means for preventing the motor from rotating backwards is provided; such means includes a magnetic pole sensor 4 which is dispoited in the axial end of the motor for detecting the commutation signal of the brushless DC motor. FIG. 3a shows a forward rotation (CW) commutation signal voltage waveform diagram of the brushless DC motor, and FIG. 3b shows a backward rotation (CCW) commutation signal voltage waveform diagram of the brushless DC motor. Magnetic pole sensor 4 detects the phase change of the motor as the motor begins to rotate in a reversed direction, and sends a signal to activate an analog switch so as to ground the braking command signal 14.

Figure 4:
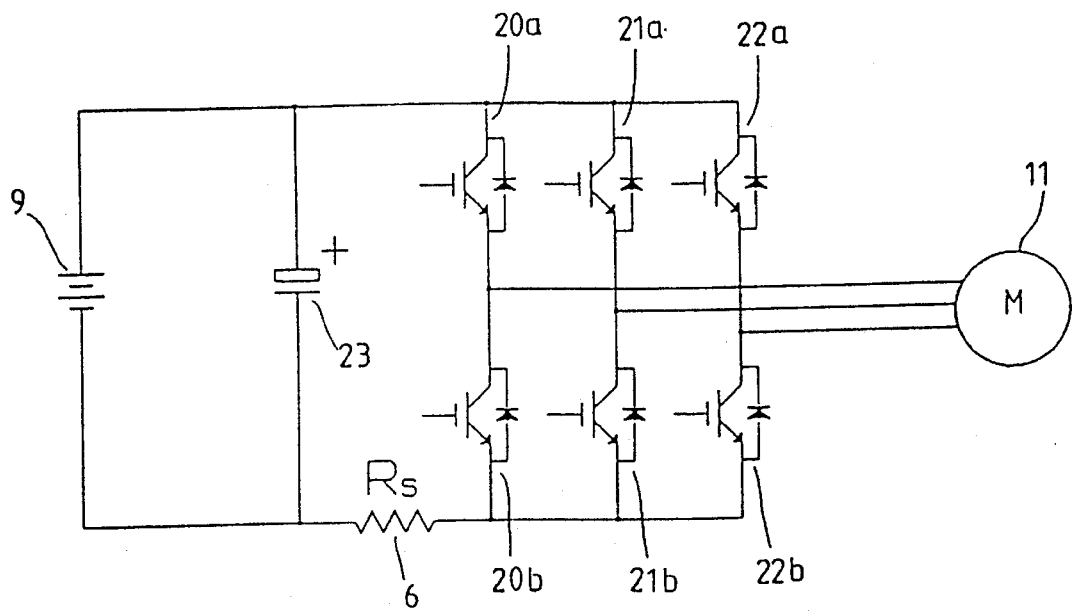
FIG. 4 is a wiring diagram of a current detector RS configured in a single current loop for controlling the torque of the brushless DC motor used in the electric motorcycle of the present invention.

In the device of the present invention a single current loop is employed to obtain a feedback current by the current detector, such as the shunt 6, to detect the current passing through the DC bus. A wiring diagram is shown in FIG. 4. In FIG. 4, 9 is the battery, 23 is a capacitor. The current passing through motor 11 is controlled by control switches 20a, 20b, 21a, 21b, 22a and 22b. The voltage signal in the shunt 6 generated by the motor current will be supplied to the low pass filter 3 where by the current is amplified and filtered and then is supplied to current compensator 2. The current compensator 2 is a proportional amplifier which is adapted to receive three input signals, including torque command signal, the braking command signal and the current feedback signal. These three signals are processed by the current compensator 2 which then produces a signal to control the voltage which is provided to the brushless DC motor used in the electric motorcycle.

Figure 5:
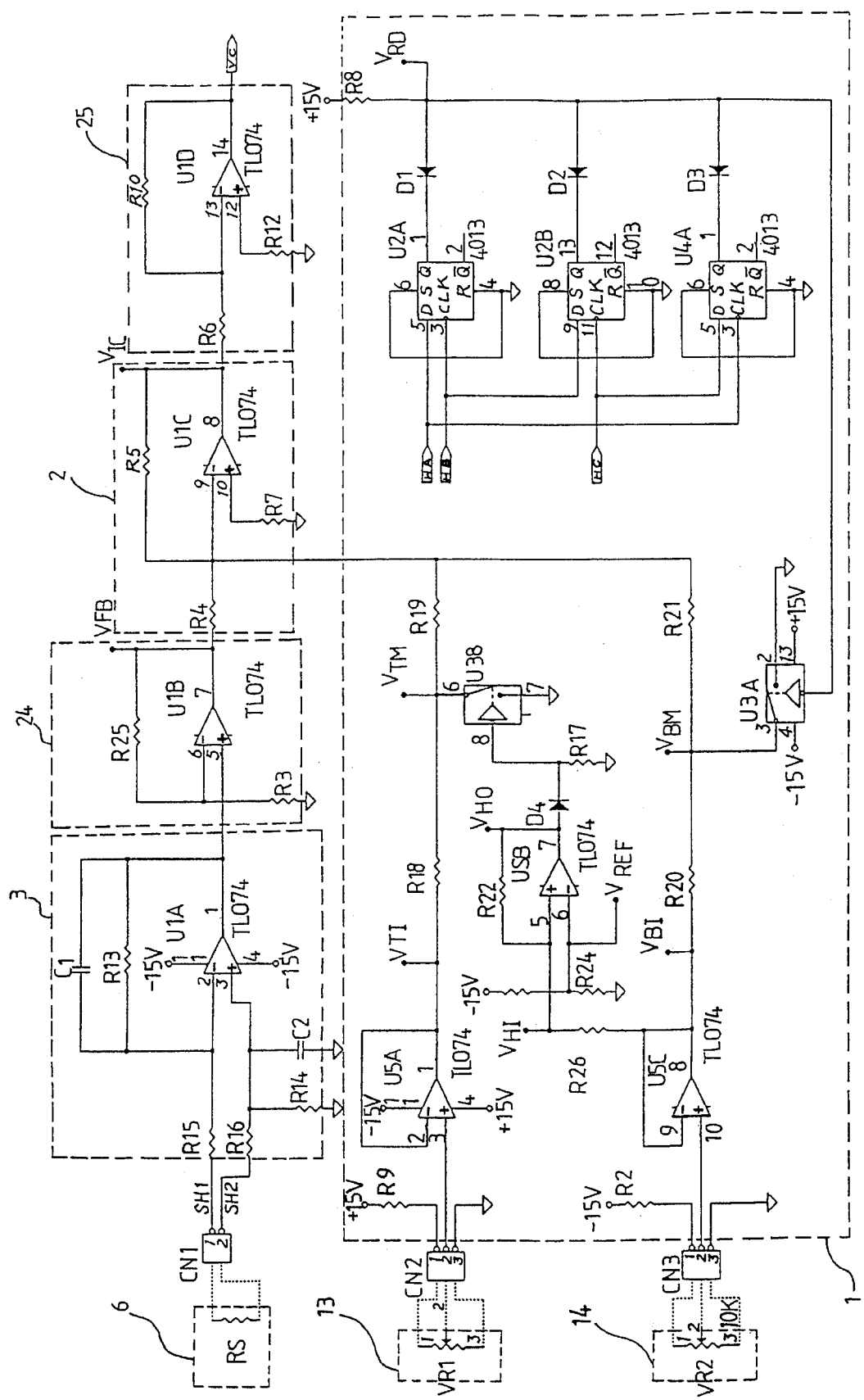
FIG. 5 is a circuit diagram of an embodiment of the present invention.

FIG. 5 is a circuit diagram of the embodiment of the present invention. In FIG. 5, the signal passing through the variable resistor VR1 is the torque command signal 13 which also passes through the buffer U5A of the signal processor 1 and is supplied to the current compensator 2 U1C. When braking command signal 14 is not supplied, the voltage $V_{TM}$ is $$V_{TM} = \frac{R19}{R18 + R19} V_{TI},$$

but if the braking command signal voltage 14 is supplied, the hysteresis level detector U5B detects the braking command signal voltage, and if the $V_{HI}$ voltage is less then the Voltage $V_{REF}$, the analog switch U3B will be actuated to the close, so that the $V_{TM}$ voltage will be grounded and the torque of the motor will be generated by the braking command signal. This condition can be expressed by the following equations:

$$V_{REF} = \frac{R24}{R23 + R24} \times (-15V)$$

$$V_{HI} = \frac{R26}{R22 + R26} V_{HO} + \frac{R22}{R22 + R26} V_{BI},$$

so that $$V_{TM} = \begin{cases} \frac{R19}{R18 + R19} V_{TI}, & V_{HI} > V_{REF} \\ 0, & V_{HI} < V_{REF} \end{cases}$$

The signal passing through the variable resistor VR2 is the braking command signal 14 which also passes through the buffer U5C of the signal processor 1 and is supplied to the current compensator 2 U1C. Before the reversed rotation of the motor 11 is detected, the voltage $V_{BM}$ is $$V_{BM} = \frac{R21}{R20 + R21} V_{BI}.$$

But as the motor beings to rotate in the reversed direction, which is detected by magnetic pole sensor 4 such as s Hall element one of the signal voltages of U2A, U2B or U4A will drop down from high level to low level, so as to render the $V_{RD}$ potential in low level condition and to actuate the switch U3A to the close. As a result, the potential of the $V_{BM}$ will be grounded, and the motor will not be rotated in the reversed direction. This condition can be expressed by the following equations:

$$V_{BM} = \begin{bmatrix} \dfrac{R21}{R20+R21} V_{BI}, & V_{RD} = \text{"high" state} \\ 0, & V_{RD} = \text{"low" state} \end{bmatrix}$$

U1A is a low pass filter. The current passing through the DC bus is detected by a current dector, such as the stunt RS6. The voltage generated in the shunt RS6 is supplied from the terminal SH1 and SH2; such voltage passing through the differential amplifier U1A, wherein R13=R14, R15=R16, C1=C2, the gain is R13/R15, and the cut off frequency of the low pass filtering is $$fc = \dfrac{1}{2\pi R13 C1}$$

The gain of the inverse phase amplifier 24 U1B is 1+R25/R3, and its output signal is supplied to the compensator 2 U1C.

The current compensator 2 U1C is a proportional amplifier, its output voltage $V_{IC}$ is:

$$V_{IC} = -\left( \dfrac{R5}{R4} V_{FB} + \dfrac{R5}{R18+R19} V_{TI} + \dfrac{R5}{R20+R21} V_{BI} \right).$$

The inverse phase amplifier 25 U1d has a unity gain, its output voltage signal VC is supplied to the phase splitter 5, then send to the pulse width modulation (PWM) circuit 7 for controlling the voltage provided to the brushless DC motor.

The method and device for controlling the torque of the brushless DC motor used in the electric motorcycle of the present invention employs a single current loop control by detecting the current in the DC bus. The circuit scheme is simplified by using only a shunt in both the current feedback circuit and the current limiting circuit. There are two input signals in the torque control circuit of the present invention, one of them is the torque command signal to generate a positive torque of the motor, and the other is brake command signal to generate a negative torque of the *motor so as to operate a controlled brake command and store the energy generated by braking operation into a battery of the motorcycle, as well as to stop the rotation of the brushless DC motor when its electrical angle of reversed rotation is within 120°.

While an embodiment of the present invention has been shown and described, it will be understood that various changes and modifications could be made without departing from the spirit and scope of the invention as defined in the appended claims.

What is claimed is:

1. A method for controlling the torque of a brushless DC motor adapted for use in an electric motorcycle, comprising the steps of:
    (a) using a shunt to detect a current flowing through a DC bus and obtaining a feedback signal from said shunt;
    (b) adding said feedback signal to a torque command input signal, which is produced when said motorcycle is in an acceleration operation and is processed to generate a positive torque; adding said feedback signal to a braking command input signal, which is produced when said motorcycle is in a braking operation and is processed to generate a negative torque; and feeding said feedback current signal, said torque command signal, and said braking command signal to a current compensator to generate a voltage control signal;
    (c) generating a voltage in accordance with said voltage control signal and transmitting said voltage to said brushless DC motor;
    (d) changing said motor to a generator mode and storing an energy generated by said brushless DC motor to said battery during a braking operation, when said negative torque is detected to have been generated by said braking command; and
    (e) detecting a rotation of said brushless DC motor and stopping said motor's rotation when a reversed rotation of said motor is detected.

2. The method of claim 1 further comprising the steps of:
    grounding said torque command input signal so that said torque command input signal will not be supplied to said current compensator when a braking action is operated; and
    grounding said braking command input signal so that said braking command input signal will not be supplied to said current compensator, when an electrical angle of a reversed rotation of said motor is detected to be within 120° as a result of said braking operation, so as to completely cease the rotation of said motor.

3. An apparatus for controlling the torque of a brushless DC motor for use in an electric motorcycle, comprising:
    means for producing a torque command signal in response to an acceleration operation of said motorcycle, means for producing a braking command input signal in response to a braking operation of said motorcycle, a magnetic pole sensor for producing a commutation signal;
    a signal processor for processing said torque command input signal, said braking command input signal and said commutation signal; producing an output signal processed by said signal processor and sending said output signal to a current compensator;
    means for producing a feedback signal from a shunt of said motor;
    a low pass filter for filtering said feedback signal from said shunt, and means for outputting said feedback signal to said current compensator and a current limiting circuit;
    means in said current compensator for amplifying and compensating said torque command input signal, said braking command input signal and said feedback signal so as to generate a processed signal; and
    a phase splitter which is connected to said current compensator and is adapted to receive said processed signal and generate a control voltage in accordance with said processed signal to said brushless DC motor.

4. The apparatus of claim 3, which further comprises an amplifier connected to said low pass filter and said current compensator therebetween, for amplifying said feedback signals from said low pass filter and producing amplified signals to said current compensator.

* * * * *